United States Patent [19]

Nelson

[11] 3,849,921
[45] Nov. 26, 1974

[54] AIRPLANE-MOUNTED SIGN
[76] Inventor: Gerald P. Nelson, 508 Maria St., Kenner, La. 70062
[22] Filed: Dec. 14, 1973
[21] Appl. No.: 425,169

[52] U.S. Cl............................. 40/212, 244/137 R
[51] Int. Cl............................................. G09f 21/06
[58] Field of Search........... 244/136, 137 R; 40/212, 40/129 C, 213, 138; 248/58

[56] References Cited
UNITED STATES PATENTS
| 1,505,714 | 8/1924 | La Grassa | 40/212 |
| 1,506,638 | 8/1924 | Hook | 40/212 |
| 1,509,046 | 9/1924 | La Grassa | 40/212 |
| 2,001,200 | 5/1935 | Knapp | 40/212 |
| 2,591,157 | 4/1952 | Hutchinson | 40/213 |
| 3,061,247 | 10/1962 | Hyde | 244/136 |
| 3,084,890 | 4/1963 | Hyde | 244/136 |

Primary Examiner—Robert W. Michell
Assistant Examiner—Wenceslao J. Contreras
Attorney, Agent, or Firm—Berman, Bishoff & Platt

[57] ABSTRACT

A structure suspended from an aircraft for carrying an advertising sign. The structure consists of a frame connected to the aircraft wings by link bars and universal joints and rigidly connected at its center portion to the aircraft fuselage. The link bars permit free horizontal movement of the side portions of the frame to prevent drag loads from being transmitted to the wings, allowing the wings to flex in a normal manner. The frame has diagonal brace wires which transmits the drag loads to the fuselage. Ballast weights may be added to the forward or rearward ends of the frame to provide a desirable location of the frame center of gravity line relative to the wings.

10 Claims, 11 Drawing Figures

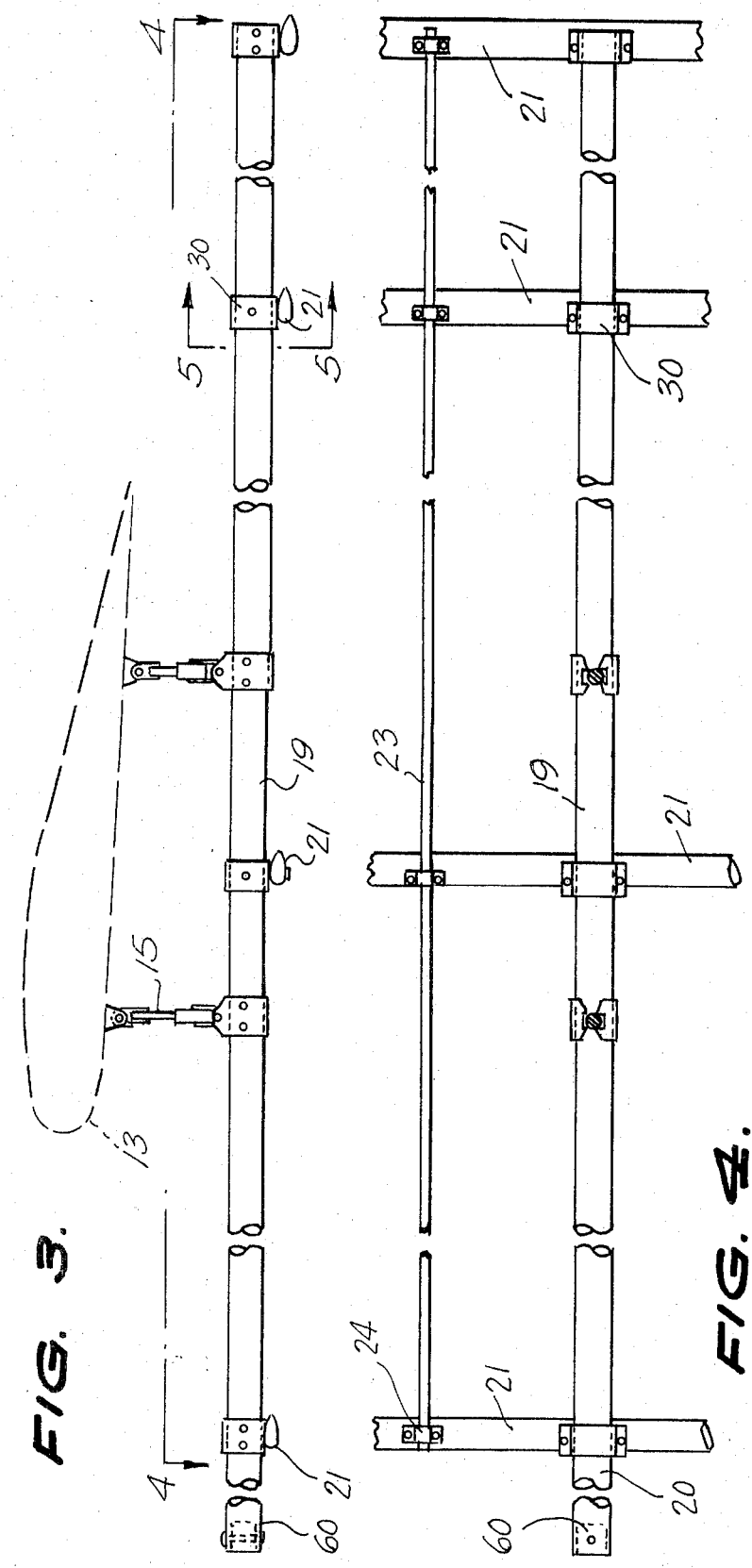
FIG. 3.
FIG. 4.
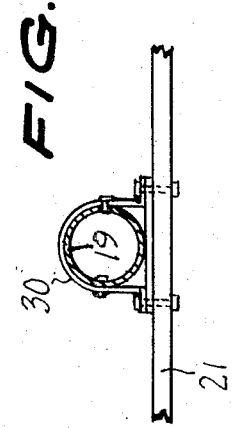
FIG. 5.

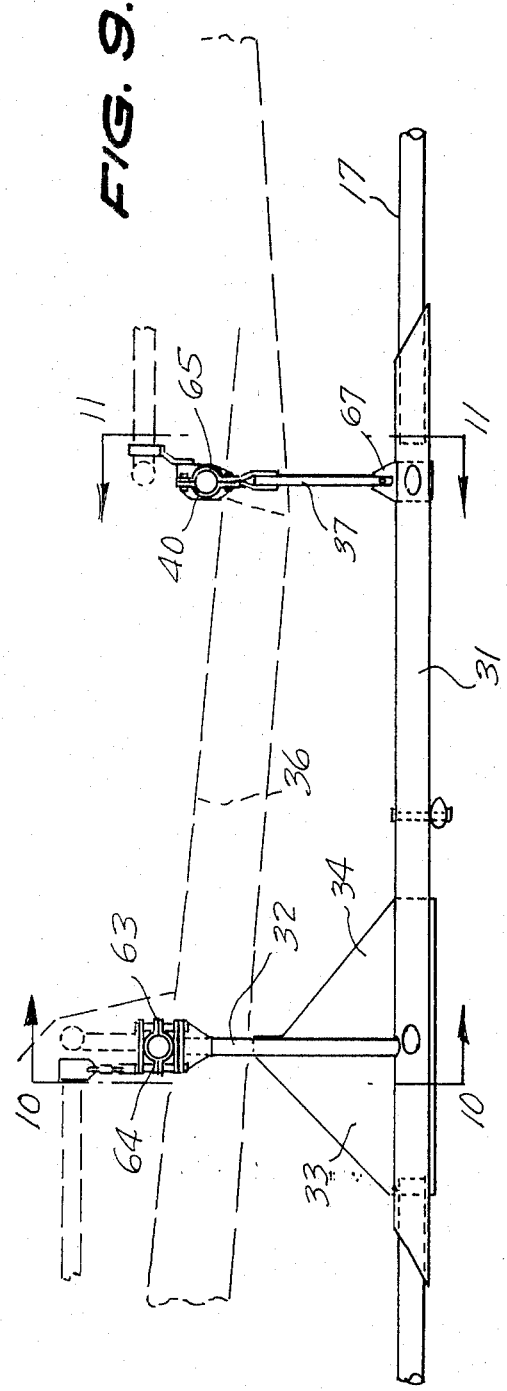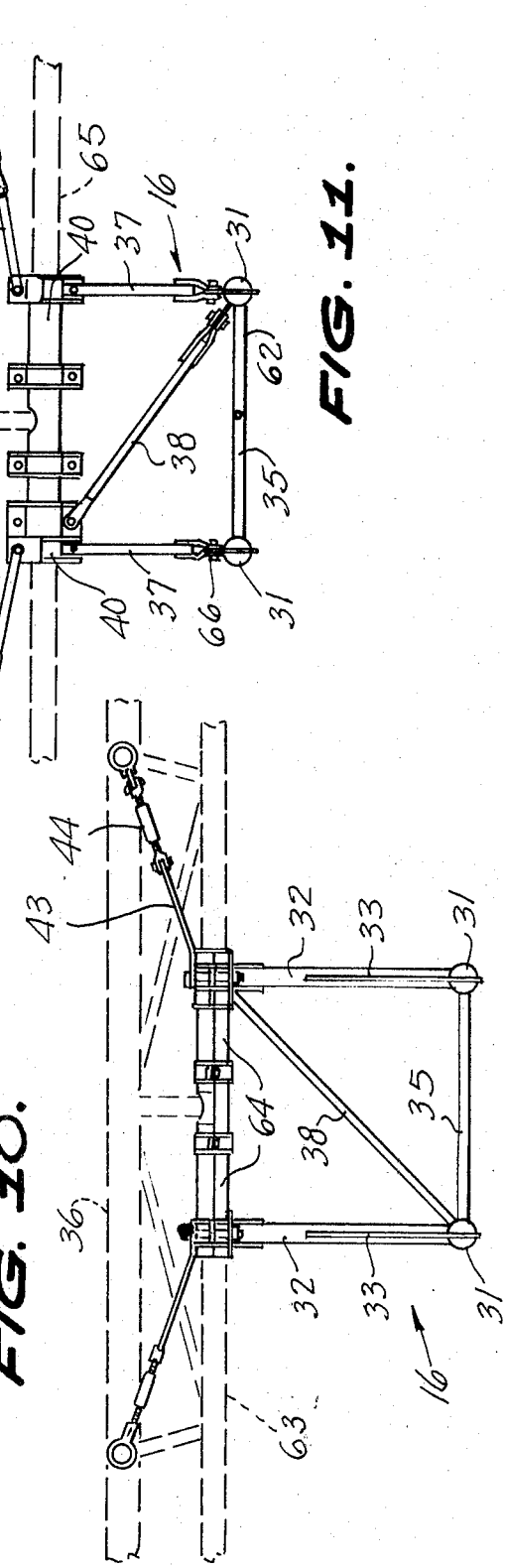

AIRPLANE-MOUNTED SIGN

This invention relates to means for carrying an object or objects beneath an aircraft, suspended from its wings, and more particularly to a structure for carrying an advertising sign suspended from the wings and fuselage of an aircraft; the suspension means being of a type imposing only vertical inertial loads on the wings and not restraining the wings from normal flexing.

A main object of the invention is to provide a novel and improved suspension structure for carrying a payload, such as an advertising sign, or the like, beneath an aircraft, the suspension structure including means connecting the load to the wings of the aircraft and being arranged to impose only vertical inertial loads on the wings while not restraining the wings from normal flexure, the structure being relatively simple, being easy to install, and being so arranged that drag loads are transmitted horizontally to the fuselage of the associated aircraft rather than to the wings.

A further object of the invention is to provide an improved structure suspended from an aircraft for carrying an advertising sign, or the like, the structure being in the form substantially of a horizontal frame and being provided with means for attaching it to the wings of the associated aircraft in a manner permitting only restricted horizontal movement of elements of the frame without transmitting any substantial components of forces resulting from such movements to the wings of the aircraft, the frame being provided with means of connection to the fuselage of the aircraft and being arranged to transmit drag loads produced by the payload and frame to the primary aircraft structure and to prevent such loads form being transmitted to the wings, whereby the wings carry no drag loads or other horizontal forces acting on the sign-carrying structure but merely support the weight of the outwardly extending portions of such structure.

A still further object of the invention is to provide an improved structure suspended from an aircraft for carrying an advertising sign or similar payload, the suspension structure being of a type wherein drag loads or other horizontal loads are transmitted to the fuselage of the associated aircraft without imposing any horizontal loading on the wings and thereby allowing the wings to flex in a normal manner, the suspension structure being further provided with means to properly locate the center of gravity of the suspension structure relative to the wings of the aircraft to minimize torsional effects on the wings produced by the suspension structure and the payload carried thereby.

A still further object of the invention is to provide an improved structure for suspending an advertising sign, or the like, from an aircraft, including means connecting the structure to the wings of the aircraft so that the advertising sign or similar payload carried by the structure is supported beneath the wings, as well as beneath the fuselage of the aircraft, the suspension structure providing a large supporting area beneath the aircraft permitting a large neon sign or similar type of advertising device to be displayed beneath the aircraft, and the suspension structure being arranged so that it imposes substantially no interference with the maneuvering of the aircraft and so that is does not place any excessive stresses on the wings or other portions of the aircraft.

Further objects and advantages of the invention will become apparent from the following description and claims, and from the accompanying drawings, wherein:

FIG. 3 is a fragmentary enlarged transverse vertical cross-sectional view taken substantially on line 3—3 of FIG. 1.

FIG. 4 is a horizontal cross-sectional view taken substantially on line 4—4 of FIG. 3.

FIG. 5 is an enlarged transverse vertical cross-sectional view taken substantially on line 5—5 of FIG. 3.

FIG. 9 is an enlarged fragmentary transverse vertical cross-sectional view taken substantially on line 9—9 of FIG. 1.

FIG. 10 is a transverse vertical cross-sectional view taken substantially on line 10—10 of FIG. 9.

FIG. 11 is a transverse vertical cross-sectional view taken substantially on line 11—11 of FIG. 9.

Figure 1:
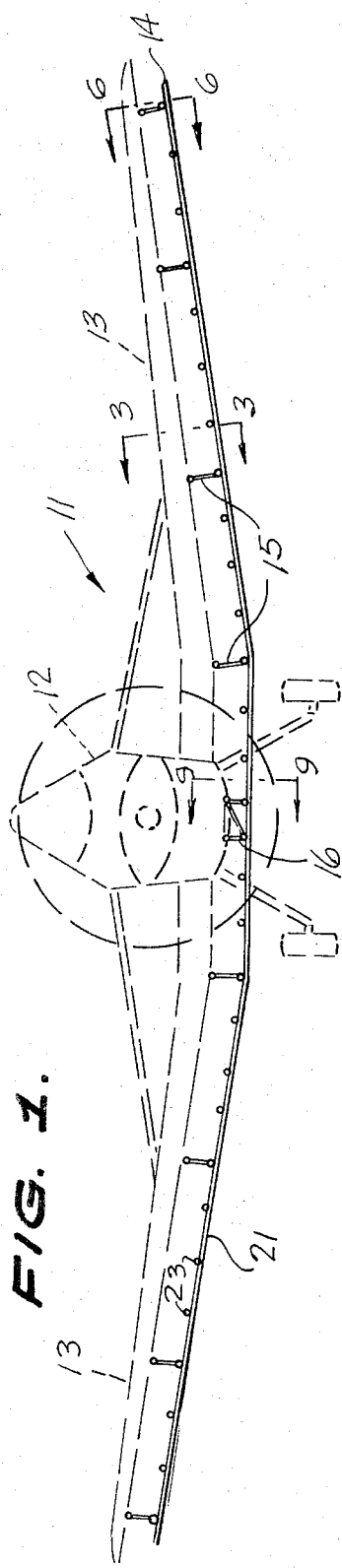
FIG. 1 is a front elevational view of an aircraft provided with a typical neon sign-suspension structure in accordance with the present invention.

One of the main objectives of the present invention is to provide a safe and reliable means for carrying a payload, such as an advertising sign, or the like, beneath an aircraft, suspended from its wings, while imposing only vertical inertial loads on the wings and not restraining the wings from normal flexure. In a typical embodiment of the invention, a horizontal neon sign-supporting frame structure is connected at its central portion to the fuselage of the aircraft and has outwardly extending portions which are relatively flexible and which are connected to the aircraft wings in a manner which permits horizontal movement of the outwardly extending portions of the sign-supporting frame, such motion being restrained only by the diagonal members mentioned hereafter. The outwardly extending portions of the sign-supporting frame are placed with diagonal members or cross members and this bracing is connected in such a manner that drag loads produced by the payload and frame are transferred to the primary aircraft structure at the fuselage portion of the aircraft. Therefore, the arrangement is such that the wings substantially are not called upon to sustain drag or other horizontal loading forces produced by the sign or its supporting structure.

The sign-supporting frame includes longitudinal beam elements which are connected to the wings by link bars with universal joints, so that these connections transfer only gravitational or other vertical loads to the wings. Universal joints are provided at the top and bottom ends of the connection links whereby to allow the wings to flex normally and substantially to transmit only vertical forces to the wings, such as the gravitational loading produced by the sign-supporting structure and the sign carried thereby.

The longitudinal support beams of the frame are connected by transversely extending frame rod elements and by diagonal wires which cooperate with the main bar elements of the frame to transmit horizontal loads to the fuselage portion of the aircraft in the manner above-described. Ballast weights may be added to the forward or rear ends of the longitudinal support beams to provide the most desirable location of the center of gravity of the frame relative to the wing so as to minimize torsional effects produced by the supporting structure and its payload on the wings. To reduce the required weight of the ballast while providing necessary balance, the longitudinal frame bars may be extended in a manner such that the weights may be properly located without the necessity of employing excessively heavy ballast weights.

Referring now to the drawings, 11 generally designates an aircraft provided with an improved sign-carrying structure constructed in accordance with the present invention. The aircraft is of generally conventional construction and comprises a fuselage 12 having oppositely extending wings 13, 13. The sign-carrying structure or frame assembly comprises a frame, shown generally at 14, which is suspended beneath the wings 13, 13 by link bars 15 in a manner presently to be described, and which is rigidly connected to the framework of the fuselage 12 at its center position by a rigid truss structure designated generally at 16.

Figure 2:
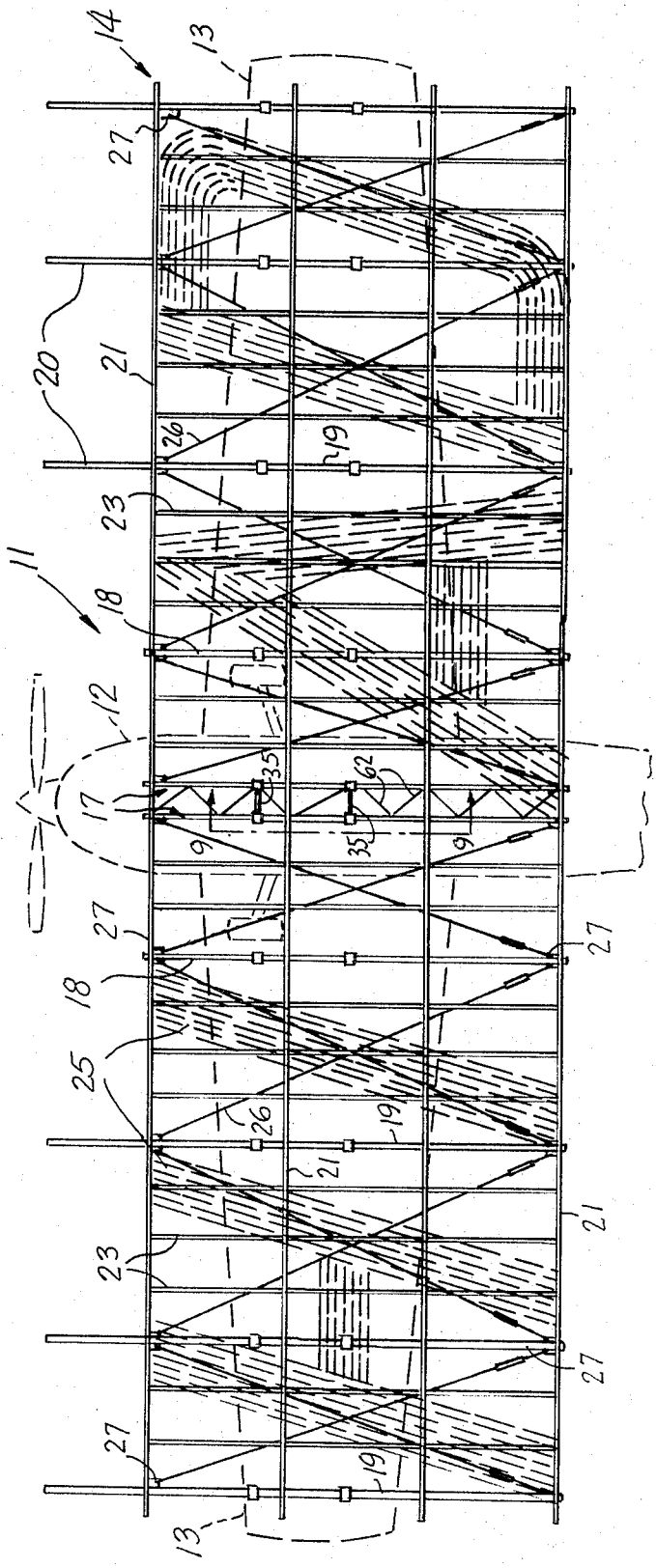
FIG. 2 is a bottom plan view of the advertising sign-supporting structure of FIG. 1.

In the typical embodiment illustrated in the drawings, which merely represents one specific embodiment of the present invention, the frame 14 comprises a pair of longitudinally extending spaced parallel centered tubular beams 17, 17 located under the fuselage 12, a pair of additional longitudinally extending tubular beams 18, 18 spaced symmetrically on opposite sides of the center beam 17, 17, and additional outwardly spaced longitudinal beams 19 spaced symmetrically on opposite sides of the fuselage 12 in the manner illustrated in FIG. 2 and being provided with forwardly extending front portions 20. As shown in FIG. 4, the longitudinal tubular beams 17, 18 and 19 are connected together by spaced transversely extending cross bars 21 which may be of tubular construction. Between the longitudinal frame bars, the transversely extending members 21 may be further connected by longitudinally extending spaced bracing rods 23 suitably secured to the cross bars 21, for example, by U-shaped flanged clamping brackets 24.

As will be seen in FIG. 2, the framework thus defined may be of substantial longitudinal length and may extend substantially for the entire wing spread of the aircraft so that it is adapted to carry a relatively large advertising sign, for example, an advertising sign comprising neon letters, figures or symbols 25 energized in a conventional manner from suitable electrical energization means carried by the aircraft.

Figure 8:
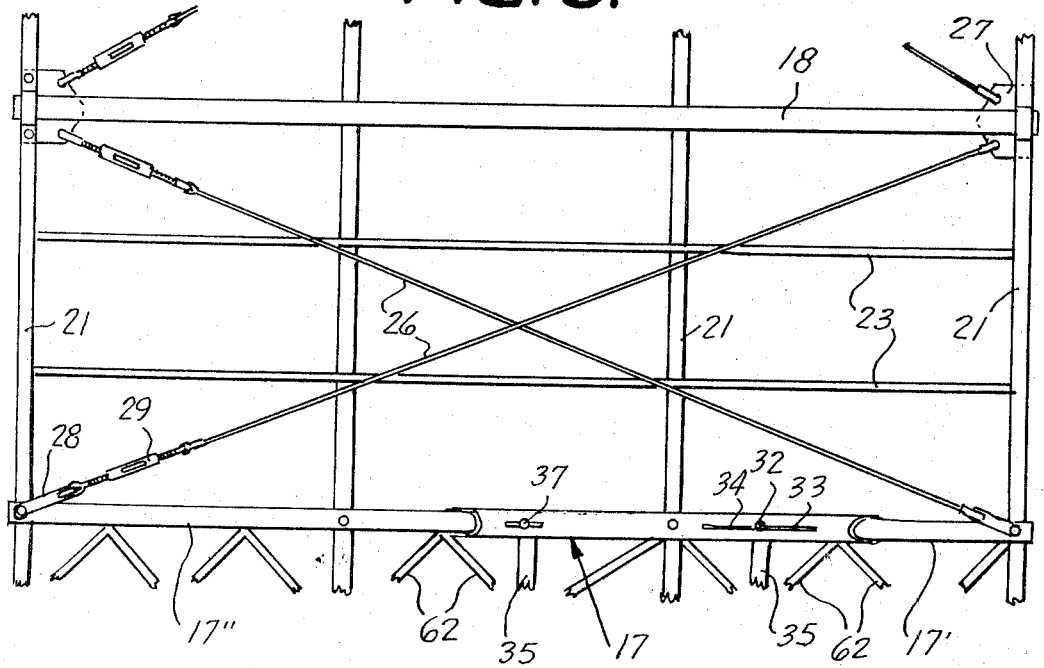
FIG. 8 is a plan view of a portion of a suspension frame structure according to the present invention showing how diagonal brace elements may be employed to transfer horizontal loads such as drag loads, or the like, produced by the payload and frame, to the fuselage of the associated aircraft.

As will be further seen from FIG. 2, the frame 14 is provided at the points of connection of the longitudinal beam elements 17, 18 and 20 with the transverse member 21 with diagonal strut wires 26 which tie together said connection points in an alternating fashion in the manner shown in FIG. 2, and which act to transmit horizontal forces, such as wind load forces, drag forces, or the like to the rigid connection structure provided between the central portion of frame 14 and the fuselage 12. In other words, horizontal structural effects on the frame 14 are resisted by the strut wires 26 and these forces are ultimately transmitted to the rigid central connection of the frame which comprises a rigid truss structure, presently to be described, connecting said center portion of the frame to the fuselage framework. In the typical embodiment illustrated in the drawings, the strut wires 26 are connected between the front and rear transverse bars 21 of the frame at the connections of these transverse bars with the main longitudinal bars of the frame. Thus, as shown in FIG. 2, each strut wire 26 is connected between apertured bracket plates 27 provided at diagonally opposite connections between longitudinal beams 18, 19 and transverse frame bars 21. At the connections with beams 17 (FIG. 8), pivotal link elements 28 are provided in place of plates 27. Turnbuckles 29 are provided between said link elements or brackets and the associated strut wire for suitably tightening said wire.

As will be seen in FIGS. 3, 4 and 5, the main longitudinal and transverse bar elements of the frame may be suitably connected together at their intersections, for example, by U-shaped flange brackets 30 engaged over the longitudinal main bar members and secured to the transversely extending cross bar members 21 therebeneath.

As shown in FIGS. 9, 10 and 11, the center longitudinal frame bar members 17 include sleeve portions 31 having upstanding posts 32 rigidly secured thereto at their forward ends, said post portions 32 being braced by integral front and rear triangular gusset plate elements 33 and 34. The sleeve members 31 are rigidly connected by horizontal cross bars 35. Inserted into opposite ends of the sleeves 31 are tubes 17' and 17'' which are secured to the sleeves by welding or other conventional means.

Figure 6:
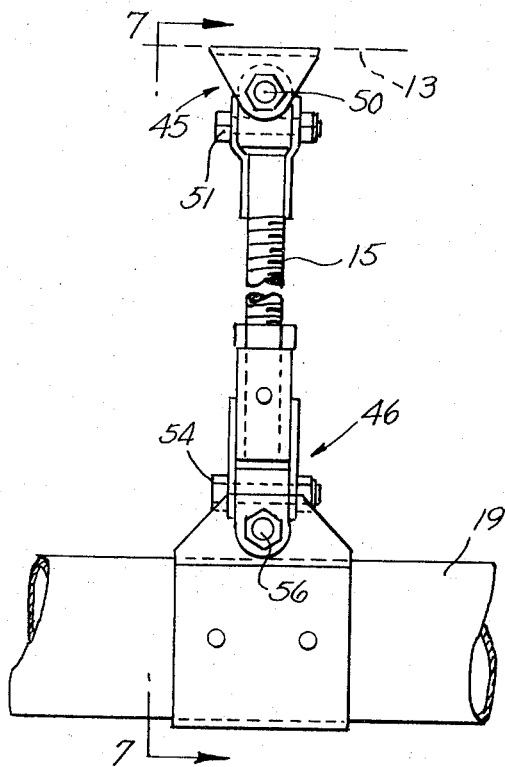
FIG. 6 is an enlarged cross-sectional view taken substantially on line 6—6 of FIG. 1.
Figure 7:
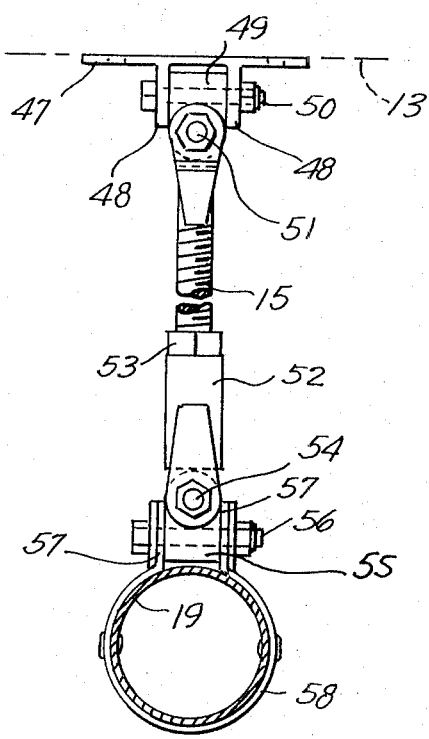
FIG. 7 is a vertical cross-sectional view taken substantially on line 7—7 of FIG. 6.

The top ends of the posts 32 are secured to a suitable support 63 of the fuselage framework by clamping bracket 64 which permits pivotal movement of the posts during installation of the truss structure 16. The rear portions of the sleeve members 31 are provided with posts 37 with their upper ends secured to a suitable support 65 of the fuselage framework by clamping brackets 40 and their lower ends connected to the sleeves 31 by bolts 66 or the like which extend through the posts 37 and plates 67, the latter extending into and being suitably secured to the sleeve 31. After installation, the clamping brackets 64 and 40, and the bolts 66 are tightened to secure the truss 16 in its selected position. The truss structure 16 thus defined is rigidly braced by braces 62, and by diagonal struts 38 connecting diagonally opposite corner portions thereof. The top ends of the struts 38 are connected to portions of the fuselage framing 36 by means of clamping brackets 64 and 40, or the like, as shown in FIGS. 10 and 11. Brackets 40 may be anchored against transverse movement to the fuselage framework by employing laterally extending tie rods 41 provided with turnbuckles 42 in the manner illustrated in FIG. 11. Similar toe rods 43 having turnbuckles 44 may be employed to anchor the top ends of the forward posts 32 against transverse movement relative to the fuselage framework 36. The link bar elements 15 which connect the longitudinal beam elements of the frame structure 14 to the wings 13 are provided at their top and bottom ends with universal joint assemblies allowing free horizontal movement of the frame structure 14 relative to the wings and acting merely to transmit gravity loading to said wings. Thus, as shown in FIGS. 6 and 7, the top end of each link element 15 is connected to a wing 13 by a top universal joint assembly 45 and is connected to the associated longitudinal frame bar by a bottom universal joint assembly 46. The top universal joint assembly 45 may comprise a first pivot bracket 47 connected to the wings 13 and having downwardly extending lugs 48, 48 between which is pivoted a second pivot bracket 49 for rotation around the axis of a horizontal pivot bolt 50. The top end of the associated link member 15 is pivoted to the bracket 49 by a horizontal pivot bolt 51 perpendicular to the pivot bolt 50. The lower universal joint assembly 46 comprises an adjustable sleeve 52 threadedly engaged on the lower portion of the link element 15 and provided with a lock nut 53. The lower end of the member 52 is connected by a horizontal pivot bolt 54 to a member 55 which is in turn pivotally connected by a horizontal pivot bolt 56 to the upstanding spaced lugs 57, 57 of a sleeve-like collar 58 rigidly secured to the associated longitudinal frame bar element, the pivot bolts 56, 54 being perpendicular to each other. Thus, the portions of the frame structure extending outwardly from the rigid center connection thereof at 16 are free to move substantially horizontally relative to the wings 13, 13 so that no horizontal load such as drag loads, or the like, will be transmitted to the wings and the wings merely support the weight and other vertical forces of the outwardly extending frame portions.

As above-mentioned, ballast beams are provided for suitably positioning the longitudinal central gravity line of the frame structure 14 so as to move it as close as possible to the aerodynamic center line of the wings 13, whereby to minimize torque effects which may be imposed on the wings by the frame structure 14 and the sign structure carried thereon. Thus, as shown in FIGS. 3 and 4, the ballast weights, shown at 60 are secured to the forward ends of the extensions 20 of the longitudinal frame bars 19, which acts in the manner above described to properly place the central gravity lines of the frame structure 14 relative to the wings. The extensions 20 may be of substantial length so as to minimize the weight of the balance element 60 required for properly positioning the center of gravity of frame structure 14 relative to the wings. The use of the extensions 20 and the ballast weights 60 thus minimize the torsional loading imposed on the wings due to the presence of the frame structure 14 and the load carried thereby, namely, the advertising sign comprising the sign elements 25 and associated wiring.

As will be understood, in the typical embodiment illustrated in the drawings, the extensions 20 are forwardly directed relative to the main body portion of the framework 14 so as to shift the center gravity of the frame structure forwardly from its normal location relative to the wings 13. However, it will be understood that in some cases, it will be necessary to shift the center of gravity line rearwardly, in which case extensions could be provided at the rear ends of the longitudinal frame bars rather than at their forward ends for receiving the required ballast weights.

In aircraft having sufficiently strong wings, the truss structure 16 may be secured to the wings alone, or to the wings and fuselage jointly.

While a specific embodiment of an improved sign-supporting structure for an aircraft has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A load-supporting frame assembly for use with an aircraft having laterally extending wings, said assembly comprising:
   a. a frame located below said wings,
   b. connecting means rigidly supporting a first portion of said frame on said aircraft,
   c. suspension means spaced from said connecting means and swingably supporting a second portion of said frame remote from said first portion to prevent horizontal forces from being imposed upon the wings,
   d. said connecting means and suspension means cooperating to permit substantially normal flexure of said wings.

2. The assembly of claim 1, and wherein the suspension means comprises a plurality of link members pivotally connected at their top portions to the wings and pivotally connected at their bottom portions to the frame.

3. The assembly of claim 2, and wherein the pivotal connections of the link members comprise universal joint assemblies.

4. The assembly of claim 1, and wherein said frame comprises a plurality of spaced longitudinal beam members and a plurality of spaced cross members connected to said longitudinal beam members.

5. The assembly of claim 4, and diagonal strut members interconnecting spaced portions of said frame and being arranged to transmit horizontal forces acting on the frame to the aircraft.

6. The assembly of claim 5, and wherein said strut members comprise flexible cable elements diagonally interconnecting intersections of said longitudinal beam members and cross members.

7. The assembly of claim 1, and ballast means on the frame arranged to locate the center-of-gravity of the frame adjacent to the aerodynamic center of the wings.

8. The assembly of claim 7, and wherein the frame includes a plurality of transversely spaced longitudinal beam members having extensions and wherein said ballast means comprises weights mounted on said extensions.

9. The assembly of claim 8, and wherein said extensions are located at the ends of said longitudinal beam members.

10. The assembly of claim 1, and wherein the connecting means comprises a depending substantially rectangular truss assembly rigidly connecting at its top portion to the aircraft and at its bottom portion to the frame.

* * * * *